United States Patent [19]

Terada et al.

[11] Patent Number: 4,916,377
[45] Date of Patent: Apr. 10, 1990

[54] VOLTAGE-REACTIVE POWER CONTROL APPARATUS

[75] Inventors: Makoto Terada; Hiroshi Suzuki, both of Tokyo, Japan

[73] Assignee: Mitsubishi Denki Kabushiki Kaisha, Tokyo, Japan

[21] Appl. No.: 323,879

[22] Filed: Mar. 15, 1989

[51] Int. Cl.$^4$ .................................................. G05F 1/70
[52] U.S. Cl. ...................................... 323/210; 323/211
[58] Field of Search ............... 323/205, 208, 209, 210, 323/211

[56] References Cited

U.S. PATENT DOCUMENTS

| | | | |
|---|---|---|---|
| 3,942,100 | 3/1976 | Käuferle et al. | 323/210 |
| 4,121,150 | 10/1978 | Kelley, Jr. | 323/210 |
| 4,174,497 | 11/1979 | Depenbrock | 323/211 |
| 4,677,364 | 6/1987 | Williams et al. | 323/210 |

Primary Examiner—Peter S. Wong
Attorney, Agent, or Firm—Bernard, Rothwell & Brown

[57] ABSTRACT

A voltage-reactive power control apparatus provided together with VAR (volt-ampere reactive) supply equipment at principal points of the power system, such as load area substations. This voltage-reactive power control apparatus monitors the power-flow and load voltage at the load area. The apparatus quickly controls VAR supply equipment etc. upon detecting of voltage abnormalities, information that otherwise would be sent to the control point at a higher level station in the power system upon making decision to provide necessary countermeasures for wider range operation of the power system.

5 Claims, 6 Drawing Sheets

VOLTAGE-REACTIVE POWER CONTROL APPARATUS

BACKGROUND OF THE INVENTION

1. Field of the Invention

The present invention relates to a voltage-reactive power control apparatus incorporated to reactive power supplying equipment for adequately sustaining load side voltages in the power system.

2. Description of the Prior Art

The voltage of a power system always fluctuates, as is well known, in accordance with change of demand and supply. Large voltage fluctuations affect not only normal application or operation life of a variety of electrical consumer appliances connected to the system, but also the insulation design of various power apparatus to be installed in the power system, and moreover interferes with stable and efficient operation of the system including a power generator from the viewpoint of operation of the power system. Namely, the voltage-reactive power control is essential for all electrical appliances and power apparatus connected to the power system to ensure normal operations and for realizing stable and efficient operation of the system.

Moreover, the increase in demand of power and difficulties in obtaining power plant sites caused by environmental concerns have resulted in power generation plants located in remote and localized, areas realization of large scale power generation base through utilization of a large capacity generator unit and long distance and high voltage transmission and heavier power flow in the power transmission facilities.

Of various problems to be overcome for safe and economical running of a higher density, larger capacity power system which is expanding and becoming more complicated year after year, following are considered as the essential problems, although a voltage problem may not easily be evaluated directly from the economical viewpoint in its effect.

(1) Voltage drop under a heavy load
(2) Abnormal rise of voltage under light load
(3) Voltage drop during system failure
(4) Improvement in performance of voltage-reactive power control during system operation.

The items (1), (2) will be described hereunder in more detail.

In general, a voltage of power system is maintained and adjusted to a preset reference value through the voltage-reactive power control of the generator and phase modifying equipment. However, if the large supply power of VAR (volt-ampore Reactive) supply equipments falls as load increases suddenly or demand and supply of the reactive power is unbalanced, voltage of the primary system may abnormally fall or rise under the situation where the power system is large in scale.

Such a system operating situation is reported in detail in the Technical Report of Japan Electrical Engineering Society (Part II), No. 238, P60.

However, such voltage failure or unstable phenomenon is not eliminated. When a cause is once set up, a local and minor failure is first generated and it is then developed to the wider and major failure. Therefore, detection at early stage and quick countermeasures are required.

The voltage-reactive power control apparatus of the prior art has mainly assigned monitoring and operation for such voltage variation or voltage abnormalities to the load dispatching center which manages operation of the whole system. Moreover the information coming from the load end is delayed, and synchronized information is not obtained. Therefore this information is inaccurate and cannot be used.

SUMMARY OF THE INVENTION

The present invention has been proposed to solve such problems and therefore it is an object of the present invention to provide a voltage-reactive power control apparatus which takes a measurement to detect a local failure and then spreads the range for measurement in case a wider area measure is required.

The voltage reactive-power adjusting equipment of the present invention is installed at the principal point of the load area in the power system.

The equipment first detects the power flow into the load and the voltage at the load side with the control and monitoring device installed within the equipment.

Next the rate of change of the power-flow and that of the voltage are calculaed from the measured value obtained as above. When each of the rate of change exceed their own limit value, the margin value is calculated by the following system data to determine the control signal to be applied to VAR supply equipment with proper time delay, where the system data includes short circuit capacity of the power system, the power flow, the load-side voltage, and the voltage stability limit of the system calculated with the load being assumed a constant-power load.

Especially when the margin for the above rate-of-change of voltage is small, the control signal to the VAR supply equipment has a time delay which depends on the ratio of voltage change to VAR supply change.

The voltage-reactive power control apparatus of the present invention also forecasts voltage collapse by detecting a voltage drop which is often generated in local load area of the system and quickly operates the near-by apparatus, and also sends information to the upper level dispatching stations controlling the wider part of system. Moreover, if a countermeasure for wider range of system is required, the apparatus of the present invention takes preventive control action which may be done properly for the wider area of system.

DETAILED DESCRIPTION OF THE PREFERRED EMBODIMENTS

A preferred embodiment of the present invention will be explained hereunder with reference to the accompanying drawings.

Figure 1:
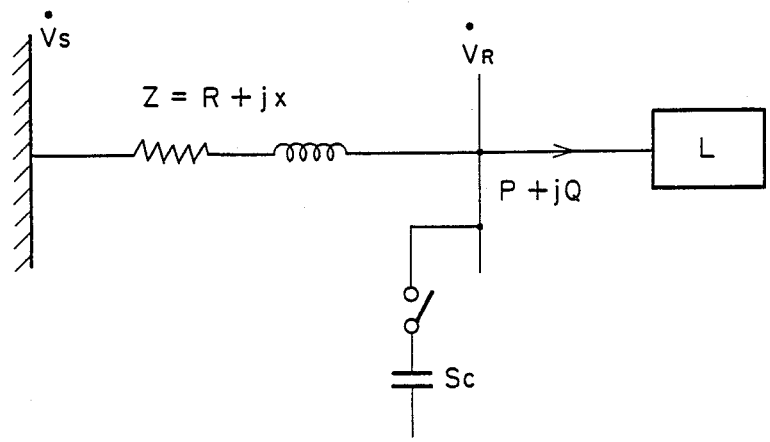
FIG. 1 is an equivalent circuit of the system for explaining the principle which is the base of the present invention.

First, the principle will be explained. FIG. 1 is an equivalent circuit of the system for explaining the principle of the present invention. In this figure, a load L (power at the load end is designated as P+jQ) is connected to the power source side of the system through an impedance Z in the side of power source. $V_R$ designates load voltage and $V_S$, voltage at the power source side.

With the short-circuit capacity of the system designated as S, the following standardization can be carried out.

$$S = \frac{V_s^2}{Z}$$
$$w = \frac{W}{S}$$
$$v_R = \frac{V_R}{V_s}$$
(1.0)

Where,
W: load power
w: standardized load power (P. U)
$V_R$: standardized load voltage (P. U)
Using w, $v_R$, following relationship can be set.

$$v_R^4 + \{2w\cos(\rho-\theta)-1\}v_R^2 + w^2 = 0 \quad (1.1)$$

Here,
$\rho$ is power factor angle of power source side impedance Z,
$\tan\rho = X/R$
Moreover,
$\theta$ is power factor angle of load side impedance $Z_L$,
$\tan\theta = X_L/R_L$
For the load power w,
$p = w\cos\theta$
$q = w\sin\theta$
Where, since p=active power and q=reactive power, from the above formula, $$\frac{\partial v_R}{\partial p} = \frac{v_R(p + v_R^2 \cos\rho)}{v_R^4 - w^2}$$

$$\frac{\partial v_R}{\partial q} = \frac{v_R(q + v_R^2 \sin\rho)}{v_R^4 - w^2}$$

moreover, $$K = \frac{\frac{\partial v_R}{\partial q}}{\frac{\partial v_R}{\partial p}} = \frac{q + v_R^2 \sin\rho}{p + v_R^2 \cos\rho}$$

where as, $$p = w\cos\theta = \frac{W}{S}\cos\theta$$
$$= \frac{W}{\frac{V_s^2}{Z}}\cos\theta$$
$$= \frac{ZW}{V_R^2}\cos\theta \cdot v_R^2$$

$$q = w\sin\theta = \frac{W}{S}\sin\theta$$
$$= \frac{ZW}{V_R^2}\sin\theta \cdot v_R^2$$

Then, as can be seen easily $$\therefore K = \frac{\frac{W}{V_R^2}Z\sin\theta + \sin\rho}{\frac{W}{V_R^2}Z\cos\theta + \cos\rho}$$
$$= \frac{\frac{Z}{Z_L}\sin\theta + \sin\rho}{\frac{Z}{Z_L}\cos\theta + \cos\rho}$$
$$\approx \frac{\sin\rho}{\cos\rho} = \tan\rho = \frac{X}{R} \quad (Z < Z_L)$$
(1.2)

Namely, $$\frac{\frac{\partial v_R}{\partial q}}{\frac{\partial v_R}{\partial p}} = \frac{\frac{\partial V_R}{\partial Q}}{\frac{\partial V_R}{\partial P}} = K = \frac{X}{R}$$

Where, S is assumed to be constant during this calculation period.

Using these relationships, a value of X/R is first obtained.

Next, from the formula (1.1), $$w = -v_R^2\cos(\rho-\theta) + \sqrt{v_R^2 - v_R^4\sin^2(\rho-\theta)} \quad (1.3)$$

From this relationship, $$S = \frac{W}{w}$$
$$= \frac{W}{-\frac{V_R^2}{V_s^2}\cos(\rho-\theta) + \sqrt{\frac{V_R^2}{V_s^2} - \frac{V_R^4}{V_s^4}\sin^2(\rho-\theta)}}$$
(1.4)

Namely, when the reference value of $V_S$ is predetermined, the short-circuit capacity S of the power system can be calculated from the above formula using the values of $\rho$, $\theta$ and $v_R$ as known values.

In addition, it is known that the formula (1.1) shows the stable limit point when the load is constant power load, with the relationships as $$w_m = \frac{1}{2\{1+\cos(\rho-\theta)\}} \quad (1.5)$$

$$v_{Rm} = \sqrt{w_m} \quad (1.6)$$

Accordingly, the values of $w_m$, $v_{Rm}$ can be obtained using the values of $\rho$, $\theta$ and S.

Where,
$w_m$ is the maximum value of load power w
$v_{Rm}$ is the maximum value of voltage in the power receiving end when the load power becomes the maximum From this result, a surplus of the current load flow and voltage for the stable limit can be calculated by the following calculation.

Namely, $$m_w = \frac{w}{w_m} \quad (1.7)$$

$$= 2\{1 + \cos(\rho - \theta)\} \cdot \frac{W}{S}$$

$$= 2\frac{W}{S}\{1 + \cos(\rho - \theta)\}$$

where $m_w$: margin of the present load flow for voltage stability limit

Next, $$m_v = \frac{v_R}{v_{Rm}} \quad (1.8)$$

$$= \frac{\frac{V_R}{V_s}}{\frac{1}{\sqrt{2}} \cdot \frac{1}{\sqrt{1 + \cos(\rho - \theta)}}}$$

$$= \sqrt{2(1 + \cos \rho - \theta)} \cdot \frac{V_R}{V_s}$$

$m_v$: margin of load voltage for voltage stability limit

Finally the present margin of power flow and voltage for the stability limit can be monitored constantly by the calculations of formulae (1.7), (1.8).

Finally, using a value S, values of p and q may be obtained as follow, $$p = \frac{W \cos \theta}{S}$$

$$q = \frac{W \sin \theta}{S}$$

and thereby, following calculations may be executed.

$$\frac{\partial v_R}{\partial p} = \frac{p + v_R^2 \cos \rho}{v_R^4 - w^2} \quad (1.9)$$

$$\frac{\partial v_R}{\partial q} = \frac{q + v_R^2 \sin \rho}{v_R^4 - w^2} \quad (1.10)$$

In summary of the above, power flow for stable voltage limit, margin of active power flow and voltage for the stable limit and sensitivity coefficient of voltage for change of power flow can be calculated and monitored by measuring the effective power P, reactive power Q and load side voltage $V_R$ at the load end and detecting changes of these values.

When voltage tends to clip and a countermeasure is required after detection and discrimination of the current condition, VAR supply equipment is to be switched.

If it is supposed that the VAR supply equipment having admittance $Y_c$ is switched, following relationship can be obtained.

$$v_R^2 = v_R^4(1 - 2ZY_c\sin\rho + Z^2Y_c^2) + 2v_R^2 w\{\cos(\rho-\theta) - ZY_c\cos\theta\} + w^2 \quad (1.11)$$

Namely, the relationship between voltage power flow when the phase VAR supply equipment is turned on is expressed as follow with reference to $V_R$ of FIG. 1, $$V_s = V_R + \frac{(R + jx)\{p + jQ - Y_c V_R^2\}}{V_R} \quad (1.12)$$

$$= V_R(1 - XY_c) + \frac{PR + QX}{V_R} + j\left(RY_c V_R + \frac{PX - RQ}{V_R}\right)$$

This formula can be written as follows through comparison of absolute values in the right and left sides.

$$V_s^2 = V_R^2(1 - 2XY_c + Z^2Y_c^2) + \{2(RP + XQ) - Z^2Y_cQ\} + \frac{Z^2W^2}{V_R^2} \quad (1.13)$$

Here, using the relationships, $$\frac{V_R}{V_s} = v_R \quad S = \frac{V_s^2}{Z}$$

$$W^2 = P^2 + Q^2$$

$$Z^2 = R^2 + X^2$$

above formula can be standardized as follows.

$$v_R^2 = v_R^4(1 - 2ZY_c\sin\rho + Z^2Y_c^2) + 2v_R^2 w\{\cos(\rho-\theta) - ZY_c\cos\theta\} + w^2$$

This is similar to the formula (1.11).

It is understood from the following explanation, load power in satisfying the above relationship becomes larger than the value in satisfying the formula (1.11) for the same load voltage $V_R$.

Namely, improvement effect of the voltage stability limit value by the VAR supply equipment can be expressed as follows:

First from the formula (1.11)

$$v_R^2 = v_R^4(1 - 2ZY_c\sin\rho + Z^2Y_c^2) + 2v_R^2 w\{\cos(\rho-\theta) - ZY_c\cos\theta\} + w^2$$

When this formula is differentiated for w as indicated below.

$$2v_R \cdot \frac{\partial v_R}{\partial w} = 4v_R^3(1 - 2ZY_c\sin\rho + Z^2Y_c^2)\frac{\partial v_R}{\partial w} +$$

$$4v_R w\{\cos(\rho - \theta) - ZY_c\cos\theta\}\frac{\partial v_R}{\partial w} +$$

$$2v_R^2\{\cos(\rho - \theta) - ZY_c\cos\theta\} + 2w$$

$$\frac{\partial v_R}{\partial w} = 2v_R^2(1 - 2ZY_c\sin\rho + Z^2Y_c^2)\frac{\partial v_R}{\partial w} +$$

$$v_R\{\cos(\rho - \theta) - ZY_c\cos\theta\} +$$

$$2w\{\cos(\rho - \theta) - ZY_c\cos\theta\}\frac{\partial v_R}{\partial w} + \frac{w}{v_R}$$

At a stability limit, the above value becomes infinite. In this case, $$w'_{om} = \frac{1 + 2\sqrt{1 - 2ZY_c\sin\rho + Z^2Y_c^2}}{2\{\cos(\rho - \theta) - ZY_c\cos\theta\}}$$

or $v'_{om} = w'_{om}$

A value of load power w for the same load voltage is expressed as follows.

$$w^2 + 2v_R^2\cos(\rho-\theta)w + (v_R^4 - v_R^2) = 0$$

In case a shunt capacitor is inserted, $$w^2 + 2v_R^2\{\cos(\rho-\theta) - ZY_c\cos\theta\}w$$

$$+ v_R^4(1 - 2ZY_c\sin\rho + Z^2Y_c^2) - v_R^2 = 0$$

Here, under the following preambles, $$\frac{\cos(\rho-\theta) - ZY_c\cos\theta}{\cos(\rho-\theta)} = a \; (<1)$$

$$1 - 2ZY_c\sin\rho + Z^2Y_c^2 = b^2 \; (<1)$$

following relationship can be obtained.

$$w^2 + 2v_R^2\cos(\rho-\theta)aw + (b^2v_R^4 - v_R^2) = 0 \quad (1.14)$$

The formula (1.12) can be solved for w.

$$w = -v_R^2\cos(\rho-\theta) + \sqrt{v_R^4\cos^2(\rho-\theta)^2 - v_R^4 + v_R^2}$$

$$= -v_R^2\cos(\rho-\theta) + \sqrt{v_R^2 - v_R^4\sin^2(\rho-\theta)}$$

$$= -v_R^2\cos(\rho-\theta) + v_R^2\sqrt{\frac{1}{v_R^2} - \sin^2(\rho-\theta)} \quad (1.15)$$

Moreover, the formula (1.14) can also be solved for w.

$$w' = -v_R^2\cos(\rho-\theta)a + \sqrt{v_R^4 a^2 \cos^2(\rho-\theta) - (b^2 v_R^4 - v_R^2)} \quad (1.16)$$

$$= -v_R^2 a \cos(\rho-\theta) + v_R^2\sqrt{a^2\cos^2(\rho-\theta) - b^2 + \frac{1}{v_R^2}}$$

$$= -v_R^2 a \cos(\rho-\theta) + v_R^2\sqrt{\frac{1}{v_R^2} + a^2\cos^2(\rho-\theta) - b_2}$$

$$= -v_R^2 a \cos(\rho-\theta) + v_R^2\sqrt{\frac{1}{v_R^2} + (b^2 + a^2) - a^2\sin^2(\rho-\theta)}$$

Next, the sign of the second item in the radical sign of the second item in the formula (1.16) is checked.

$$b^2 - a^2 = 1 - 2ZY_c\sin\rho + Z^2Y_c^2 - \left(1 - \frac{\cos\theta}{\cos(\rho-\theta)} \cdot ZY_c\right)^2 \quad (1.17)$$

$$= 2ZY_c\left(\frac{\cos\theta}{\cos(\rho-\theta)} - \sin\rho\right) + \frac{\cos^2\theta}{\cos^2(\rho-\theta)}Z^2Y_c^2$$

$$= 2ZY_c\frac{\{\cos\theta - \sin\rho(\cos\rho\cos\theta + \sin\rho\sin\theta)\}}{\cos(\rho-\theta)} + \frac{\cos^2\theta}{\cos^2(\rho-\theta)}Z^2Y_c^2$$

First item $= \dfrac{\cos\theta(1 - \cos\rho\sin\rho) + \sin\theta\sin^2\rho}{\cos(\rho-\theta)} > 0$ Second item $= \dfrac{\cos^2\theta}{\cos^2(\rho-\theta)}Z^2Y_c^2 > 0$ From the formula (1.16), $$\therefore b^2 - a^2 > 0 \therefore b > a$$

Comparison between the value in the radical sign of the second items of the formulae (1.14) and (1.15) results in the following relationship.

$$\Delta_2 = \frac{1}{v_R^2} - \sin^2(\rho-\theta) - \left\{\frac{1}{v_R^2} + (b^2 - a^2) - a^2\sin^2(\rho-\theta)\right\}$$

$$= -\sin^2(\rho-\theta) - (b^2 - a^2) + a^2\sin^2(\rho-\theta)$$

$$= -(b^2 - a^2) - (1 - a^2)\sin^2(\rho-\theta) < 0$$

In the same way, comparison between the first items results in the following relationship.

$$\Delta_1 = -v_R^2\cos(\rho-\theta) - \{-v_R^2 a\cos(\rho-\theta)\} = v_R^2\cos(\rho-\theta)(a-1) < 0$$

clearly from the above $$\Delta_1 + \Delta_2 < 0$$

Therefore $$w - w' = \Delta_1 + \Delta_2 < 0 \therefore w < w' \quad (1.18)$$

$$w = -v_R^2\cos(\rho-\theta) + v_R^2\sqrt{\frac{1}{v_R^2} - \sin^2(\rho-\theta)} <$$

$$-v_R^2 a\cos(\rho-\theta) + v_R^2\sqrt{\frac{1}{v_R^2} - a^2\sin^2(\rho-\theta) + (b^2 - a^2)} =$$

-continued w' (power flow value when the shunt capacitor is inserted)

On the contrary, a pair of values of $v_R$ can be obtained for w by solving the formula (1.11) for $v_R$. In the case of inserting the shunt capacitor, the maximum power flow value $w_m$ can be proved in the following relationship by the calculation conducted below.

$$w'_m = \frac{1 + 2\sqrt{1 - 2ZY_c\sin\rho + Z^2Y_c^2}}{2\{\cos(\rho - \theta) - ZY_c\cos\theta\}}$$

$$= \frac{1 + 2b}{2\{1 + \cos(\rho - \theta) - (1 + ZY_c\cos\theta)\}}$$

$$= \frac{1}{2} \cdot \frac{1 + 2b}{1 + \cos(\rho - \theta) - (1 - a)\cos(\rho - \theta)}$$

$$= \frac{1}{2} \cdot \frac{1}{1 + \cos(\rho - \theta)} \cdot \frac{1 + 2b}{\left\{1 - \frac{(1 - a)\cos(\rho - \theta)}{1 + \cos(\rho - \theta)}\right\}}$$

$$= w_m \cdot \frac{1 + 2b}{1 - \frac{(1 - a)\cos(\rho - \theta)}{1 + \cos(\rho - \theta)}} \quad a < 1$$

$$< w_m$$

Inversely, the stability limit of power flow can be improved remarkably for the case where the shunt capacitor is not inserted. By the way, the value of the stability limit improvement can also be foreseen because the values of Z, $Y_c$, S, W, $\rho$, $\theta$ can be known.

Meanwhile, using the time reference adequately controlled, such stability limit can also be obtained from P, Q, $V_R$ obtained by measuring $$\frac{\Delta p}{\Delta t}, \frac{\Delta q}{\Delta t}, \frac{\Delta v_R}{\Delta t}$$

and the value S calculated.

Direction and magnitude of change for P, Q, $V_R$ can be known by supervising such values from time to time.

Namely, it can be determined whether values of p, q, v are changing suddenly or gradually and in the safe or risky direction by checking relationship of $$\left(p - \frac{\Delta p}{\Delta t}\right)\left(q - \frac{\Delta q}{\Delta t}\right)\left(v_R - \frac{\Delta v_R}{\Delta t}\right).$$

A system configuration indicating the embodiment of the present invention will now be explained.

Figure 2:
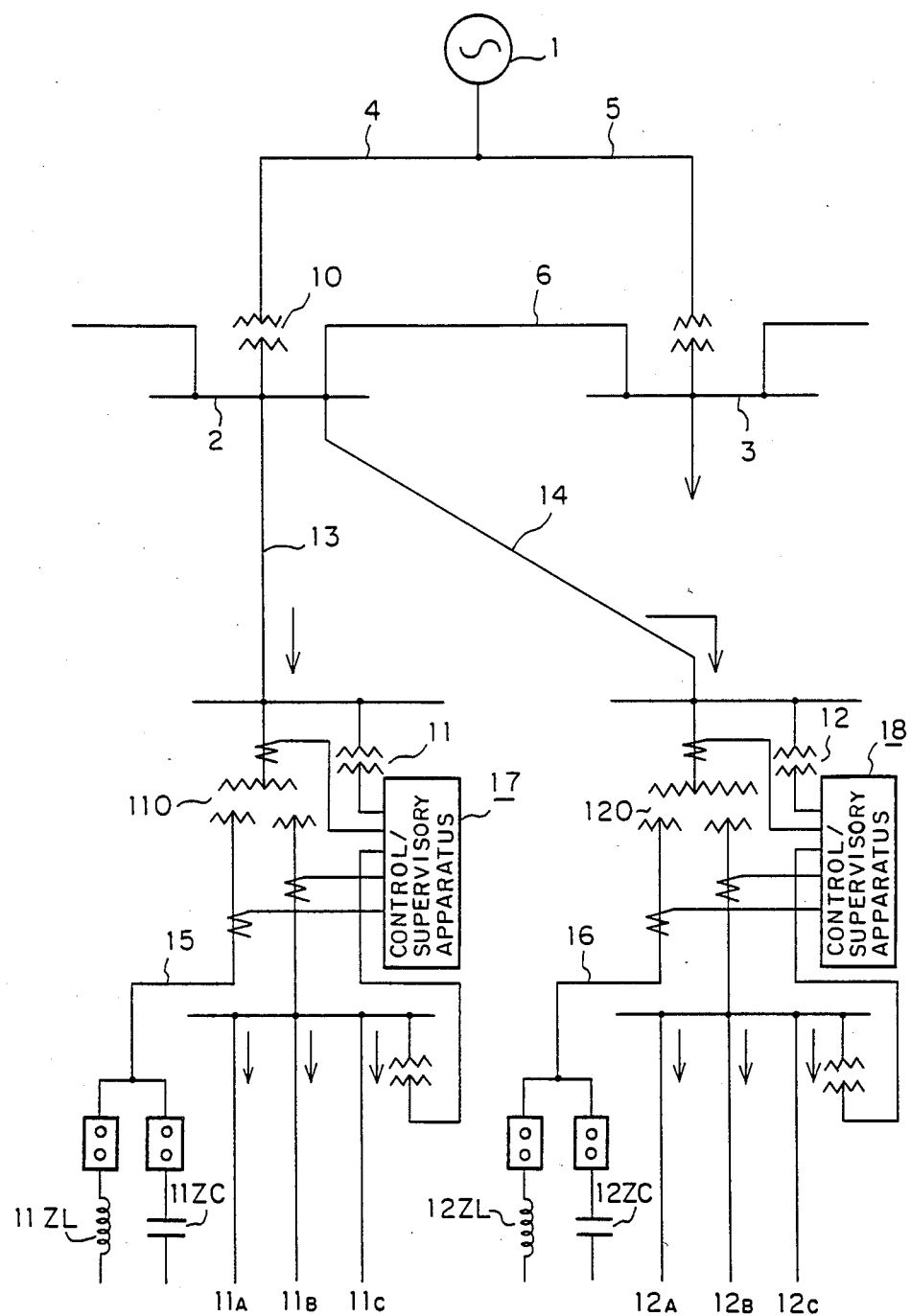
FIG. 2 is a block diagram of the configuration of a voltage-reactive power control apparatus of a preferred embodiment of the present invention.
Figure 3:
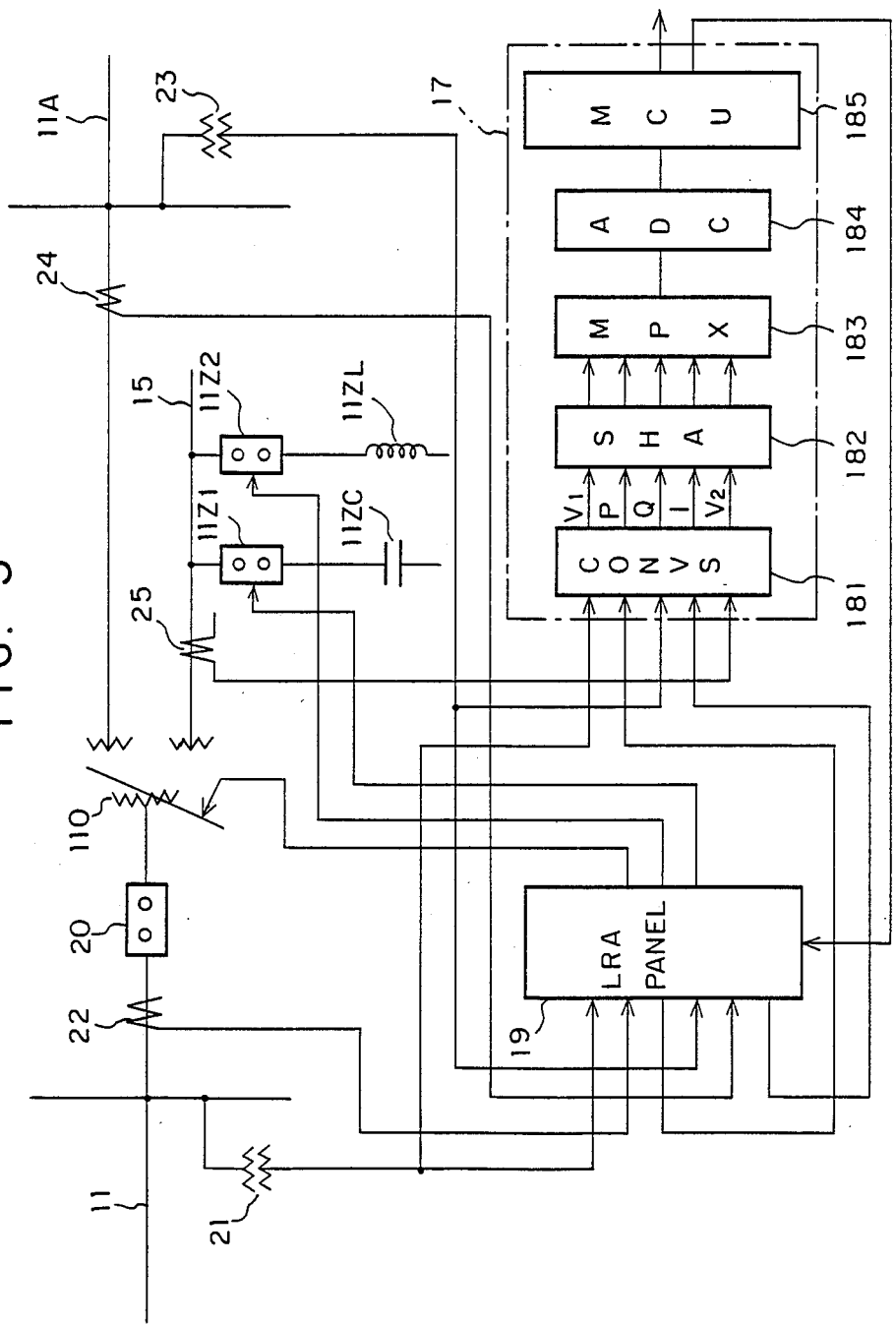
FIG. 3 is a block diagram of the detailed configuration of a control and supervisory devices shown in FIG. 2.

In FIG. 2, 2 and 3 designate the primary substations being connected to the power source 1 through the transmission lines 4, 5. The primary substations 2 and 3 are linked through the line 6.

11, 12 . . . are the secondary substations located near the load areas from the primary substations. The primary substation 2 and secondary substation 11 are linked through the line 13 and the primary substation 2 and secondary substation 12, through the line 14.

The load feeders 11A, 11B, 11C, . . . are connected to the low voltage side of bank 110 of the secondary substation. Moreover, it is also assumed that the tertiary side of bank 110 has VAR supply equipment on bus 15.

With such system configuration, the power flows from 1 to the load through the transmission line 4, banks 10, 110 and feeders 11A, 11B, 11C. Also from the bank 120 which is in parallel with the bank 110 of the secondary substation 11, the power flows to a load through the feeders 12A, 12B, 12C.

In such a power system, the control and monitoring devices 17, 18 are respectively provided to the banks 110, 120 of the secondary substations 11, 12. Since the feeders 11A, 11B, 11C, 12A, 12B, 12C viewed from the banks 110, 120 are all in the load area, the direction of the power flow is uniform.

That is, the power system as seen from the control and monitoring device 17, 18 location can be regarded as the power source 1, and the feeders 11A, 11B, 12A, 12B, 12C as the load.

Besides the reverse power flow does not occur.

In such a system configuration and layout of apparatus and devices, the balance between the load and power source, and the variation of load are measured, detected and monitored near the banks 110, 120 and the VAR supply equipments 11Z (shunt reactor 11ZL, shunt capacitor 11ZC) are adjusted and controlled as required. The system as an object of the present invention has the configuration and layout described above and the power flow of that system flows in a uniform direction.

Namely, the bus of load voltage $V_R$, described in the explanation about the principle, corresponds to a high voltage bus from the secondary substations 11, 12, the banks 110, 120 and others to a load side and a part of the phase modifying equipments 11ZL, 11ZC, 12ZL, 12ZC connected to the buses 15, 16 of the phase modifying equipment to a shunt capacitor (SC).

A practical example of the control and monitoring devices connected to the system will be explained.

In FIG. 3, the same elements as that in FIG. 2 are given like numerals and the same explanation will not be repeated.

In that figure, 20 designates a primary circuit breaker of the bank 110; 21, potential transformer (PT) for high voltage bus; 22, current transformer (CT) for primary current of bank 110; 23, transformer for measuring voltage of intermediate voltage bus; 24, current transformer for secondary current of the bank 110. Outputs of these PTs and CTs are input to the on-load tap changing control panel 19 and the control and supervisory apparatus 17. 25 designates current transformer for tertiary current of the bank 110 and the output thereof is also input to the control and supervisory apparatus 17. 19 is existing on-load tap changer control panel (hereinafter referred to as LRA panel) having the voltage-reactive power regulating function. The control and supervisory apparatus 17 is provided for controlling such LRA panel 19.

Next, the control and supervisory apparatus 17 will be explained hereunder in detail.

181 denotes converter circuit which receives four signals being input to the LRA panel 19 and the signal sent directly from the transformer 25 for measuring tertiary current of the bank 110. With these inputs, the effective power P, reactive power Q, primary voltage $V_R$ of bank, and secondary voltage of bank, tertiary capacitance $Q_c$ of bank of the bank 110 as a whole are measured.

182 denotes sample and hold amplifier which holds analog value of output voltage of converting circuit 181.

183 denotes multiplexer which receives five signals whole effective power P, reactive power Q, primary voltage $V_R$ of bank, secondary voltage of bank, and tertiary capacitance $Q_c$ of bank of the bank 110 from the output side of sample hold amplifier 182 and switches them over by the control command from the microcontroller 185.

184 denotes A/D converter connected to the multiplexer 183 for converting an input analog voltage into a digital value.

185 designates microcontroller connected to the A/D converter 184. This microcontroller sequentially receives inputs of such analog measured values for the functional operation to be described hereafter, operating the circuit breakers 11Z1, 11Z2 through the LRA apparatus 19 as a result of such functional operation measured values and also transmitting the result to the electrical stations for operating and controlling the primary side of the secondary substation.

Figure 4:
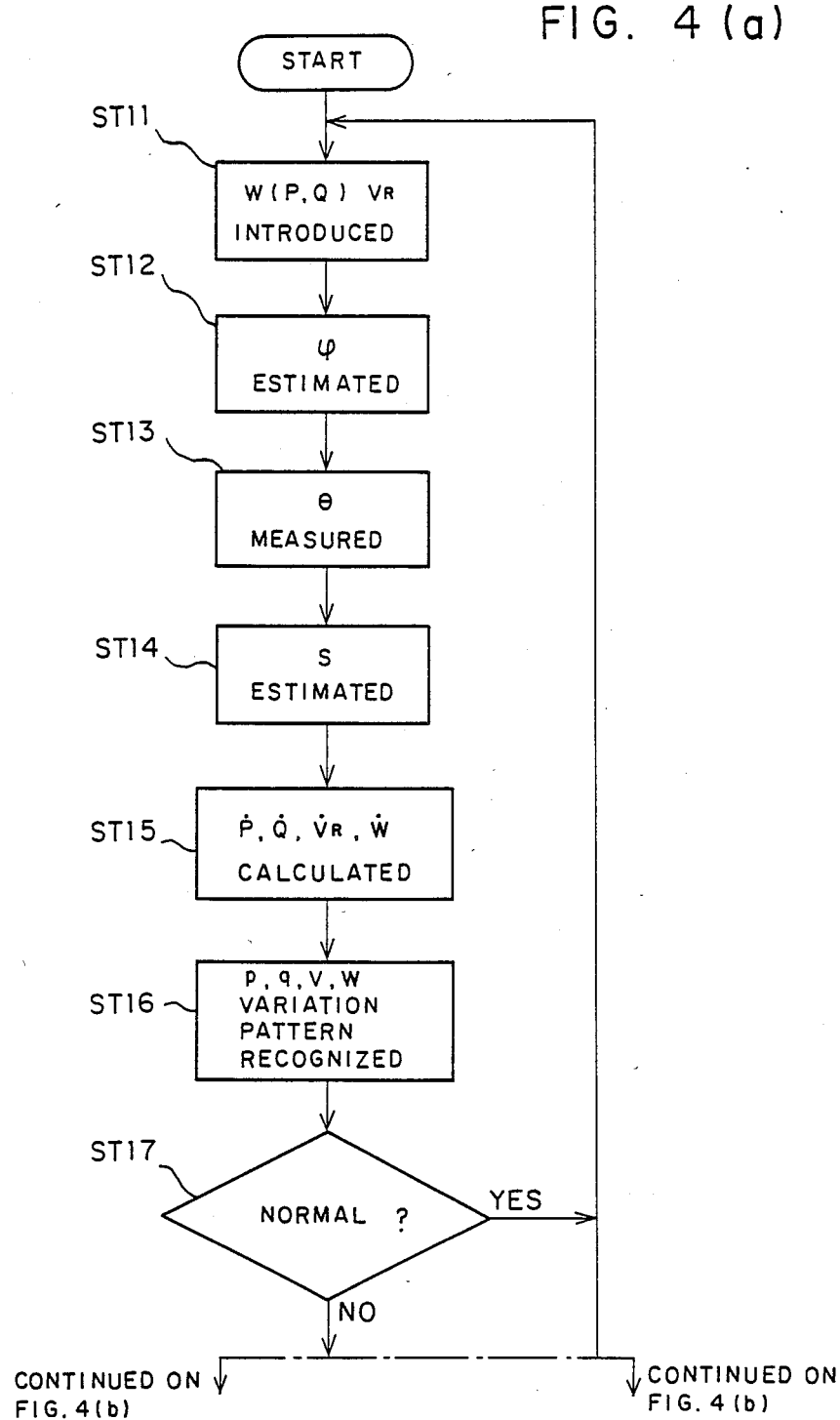
FIG. 4(a)–4(c) are a flowchart of the operations of a voltage-reactive power control apparatus of a preferred embodiment of the present invention.
Figure 4B:
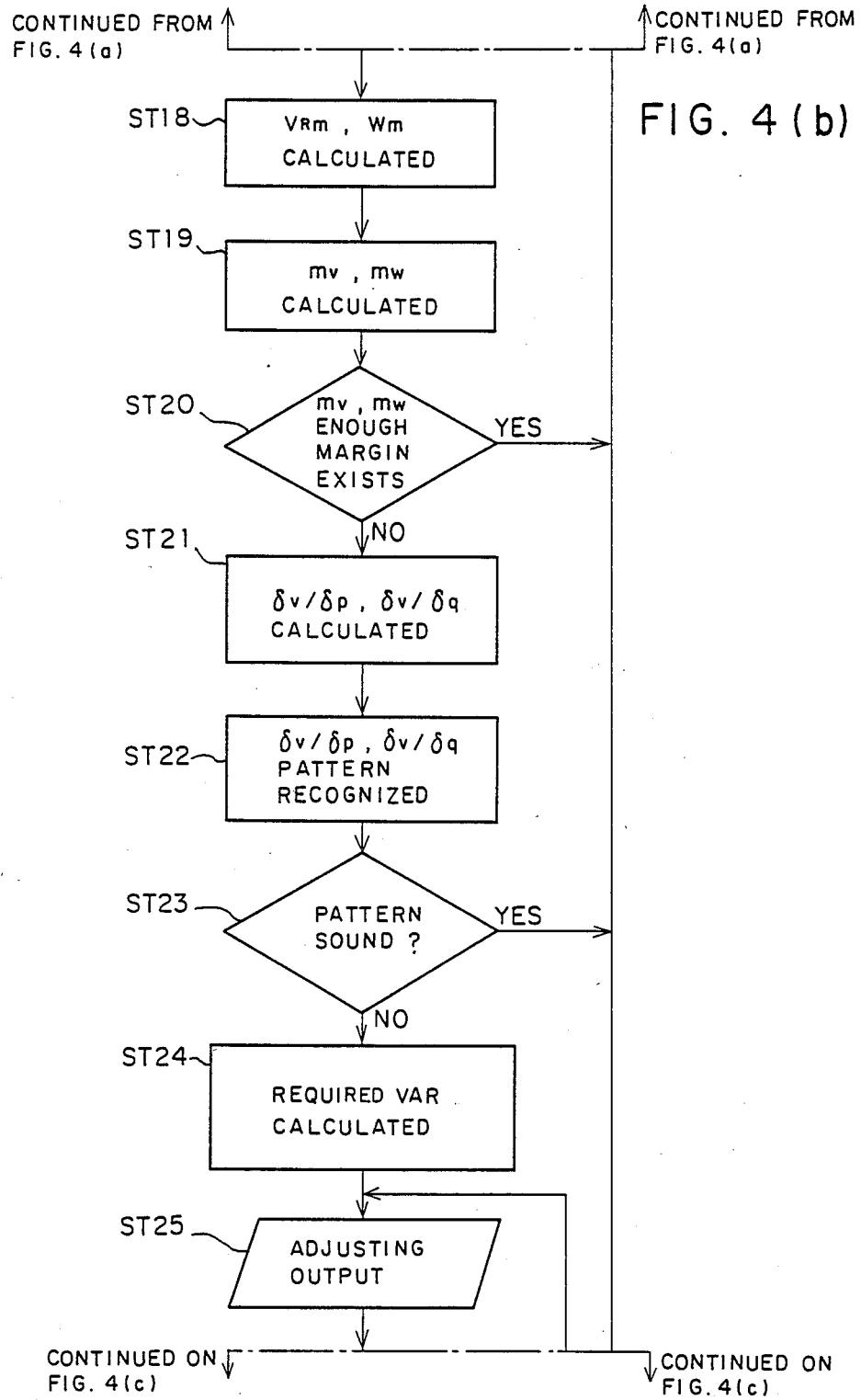
Figure 4:
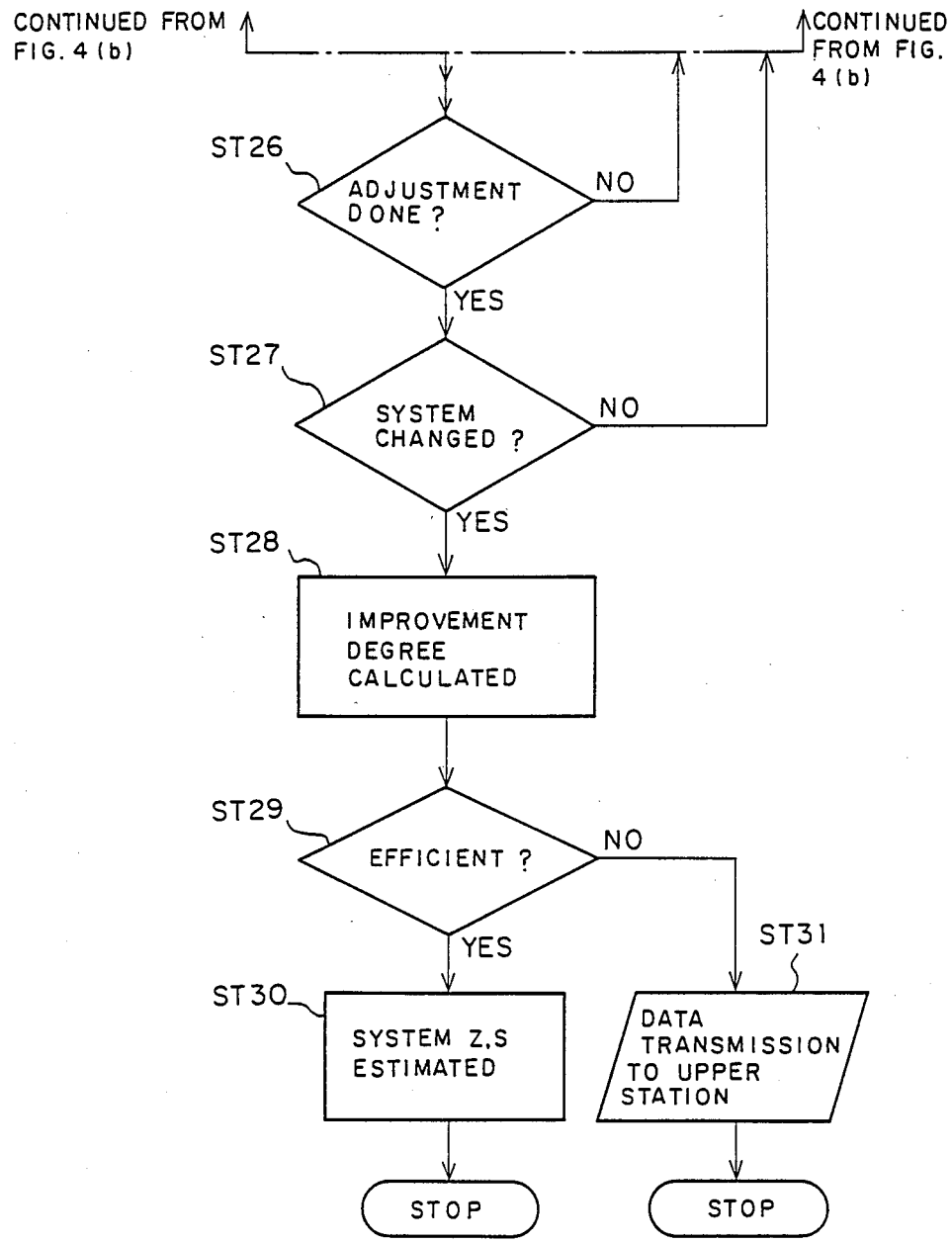

Next, operations of the control and supervisory devices 17 will then be explained using a flowchart of FIG. 4.

First, a load voltage $V_R$ at the principal point in the system connecting the apparatus of the present invention and a power flow W ($=P+jQ$) flowing into the load passing through such point are read in the step ST11.

Each rate of change of effective power P and reactive power Q is calculated from power flow (P,Q), load voltage $V_R$ and previously measured value of them and a phase angle $\rho$ of system impedance is estimated in the step ST12 in accordance with the formula (1.2). Within a very short period, the phase angle $\rho$ may be assumed as constant. Next, the phase angle $\theta$ of the load is measured in the step ST13. After obtaining the value of X/R, the normalized power flow w is calculated by the formula (1.3) using the phase angle $\rho$ of power source and the phase angle $\theta$ of load. Next, the short-circuit capacity S of the system is obtained in the step ST14 by dividing a value of power flow W with the normalized power flow w.

Here, since the values of $V_R$, P, Q, W, S, $\rho$, $\theta$ are already known, following values can be obtained for the adequate time interval $\Delta t$ in the step ST15 from such values.

$$p = \frac{\Delta p}{\Delta t} \quad q = \frac{\Delta q}{\Delta t}$$
$$w = \frac{\Delta w}{\Delta t}$$
$$v_R = \frac{\Delta v_R}{\Delta t}$$

From the values of p, q, w, $v_R$ and the current values of p, q, w, $v_R$, the variation and the rate of the change (magnitude and direction) of the power flow and voltage normalized in current can be sensed in the step ST16.

When the power flow and voltage values observed in these cases are near the reference limit value having been set by separate calculation on the off line basis, or in case the power flow and voltage are very far from the reference limit value but these rates of the change are large, sequential operation is shifted to the next step (step ST17) regarding such values to be within the area of the pattern of system dynamic change.

Namely, the stability limit values of the system with constant power loads such as $v_{Rm}$, $w_m$ of the formulae (1.5), (1.6) are obtained in the step ST18 using the values of $\rho$, $\theta$ (S, P, W, $V_R$) obtained from the assumption method described above.

Using these values, margin of power flow limit (formula 1.7) in the case where whole loads can be considered as the constant power load is obtained in the step ST19.

$$m_w = 2\frac{W}{S}\{1 + \cos(\rho - \theta)\} \tag{1.7}$$

A voltage margin $m_v$ for the voltage stability limit can be checked in the step ST20 using the formula (1.8).

This value is recognized to be proper if the difference between this and the stability limit calculated separately by the off-line calculation is not significant. Then the power system operation can be safely continued (steps ST21-23).

If this value is larger than a reference model value of the off-line calculation, sensitivity coefficient of the power flow-voltage is again calculated using the formulae (1.9) and (1.10).

This sensitivity coefficient becomes large with the increase of power flow, but it is also known that not only the sensitivity coefficient of q-$v_R$ but also the sensitivity coefficient of p-$v_R$ become large at the value near voltage stability limit as causing voltage to be fallen rapidly. Particularly when the values of $\delta v_R/\delta p$, $\delta v_R/\delta q$ exceed 1, it indicates that the system operation is in the dangerous area. Therefore, it is decided whether such values have exceeded or not the set value obtained by dividing such value with an adequate margin. When the value is in the safe zone, operation is continued, and otherwise, the system change operation starts (step ST22, 23).

For the change of the system operation, switching of VAR supply equipment is required. The required amount of VAR to be supplied from the equipment is calculated from the equation (1.11) giving the system voltage $V_R$ to be maintained for the present power flow.

When a calculated VAR value is within VAR supply equipment capacity which may be obtained at the adjusting point, the required minimum equipment capacity is applied or when such value is larger, the maximum equipment capacity which may be available at present is applied (step ST25, 26).

If the VAR supply equipment which may be operated is short in total, such information is transmitted to the electrical station which is capable of operating the systems of the wider range including such load system as the object of operation (step ST27), and, for example, possibility of similar voltage adjustment is decided for operation in the primary substation 2 shown in FIG. 2.

After a series of such operations proceeds and the VAR supply equipment is operated (or in some cases, that equipment is turned off), changes occur for the voltage-power flow of the system. Therefore, such changes are detected and measured in the step ST28. In the step ST29 the value before adjusting operation is compared with current value thereby, verifying the improved effect of system (voltage-power flow) operation.

In case such effect is considered insufficient, a value being change of system condition generated by such turning on is used for deciding (step ST30) the short-circuit impedance Z and short-circuit capacity S. At the same time, it is stored as values of the new system constants which is used for deciding the next sequential operation after this operation.

In addition, when improving effect of system operation is still insufficient, various values such as insufficient VAR supplying capacity and other system conditions are transmitted to the electrical stations of the higher voltage side, enabling the system operation viewed from the upper voltage side (step ST31).

What is claimed is:

1. A voltage-reactive power control apparatus comprising:
    measuring means for measuring a power flow and a voltage at a load end of a power system;
    power flow supervisory means for calculating a rate of change of effective power and reactive power from the measured power flow and load voltage and supervising such rate of change;
    short-circuit capacity calculating means for calculating short-circuitry capacity of said power system changing from time to time;
    stability limit calculating means for calculating stability limits of power flow and load voltage with reference to a constant power load and also calculating margin from the measured power flow and load voltage, calculated short-circuit capacity and stability limit; and
    VAR supply equipment capacity control means for calculating voltage sensitivity coefficient for change of power flow from the calculated power flow and load voltage and controlling the VAR supply equipment with the corresponding time delay to the sensitivity coefficient.

2. A voltage-reactive power control apparatus according to claim 1, wherein said measuring means comprises a voltage measuring potential transformer connected to a high voltage bus of bank of substation, a primary current measuring current transformer, a second voltage measuring potential transformer connected to the intermediate voltage bus of bank of substation, a secondary current measuring current transformer, a tertiary current measuring current transformer, and a converter circuit which receives an output of these transformers and, converts to effective power, reactive power and load voltage.

3. A voltage-reactive power control apparatus according to claim 2, wherein said power flow supervisory means, short-circuit capacity calculating means, stability limit calculating means and VAR supply equipment capacity control means comprise a sample hold amplifier for holding outputs of said converter circuit, a multiplexer for selecting outputs of said sample hold amplifier, an A/D converter for analog/digital conversion of outputs from said multiplexer and a microcontroller for making calculation by inputting outputs of A/D converter.

4. A voltage-reactive power control apparatus according to claim 3, wherein said converter circuit, sample hold amplifier, multiplexer, A/D converter and microcontroller form a unit of control and supervisory apparatus.

5. A voltage-reactive power control apparatus according to claim 3 or 4, wherein VAR supply equipment includes one of a shunt reactor, a shunt capacitor and a combination of the above two.

* * * * *

UNITED STATES PATENT AND TRADEMARK OFFICE
CERTIFICATE OF CORRECTION

PATENT NO. : 4,916,377

DATED : April 10, 1990

INVENTOR(S) : Makoto Terada et al.

It is certified that error appears in the above-identified patent and that said Letters Patent is hereby corrected as shown below:

On the cover page, in the Abstract, line 2, "(volt-ampere reactive)" should be --(Volt-Ampere Reactive)--.

Column 1, line 52, "(volt-ampore Reactive)" should be --(Volt-Ampere Reactive)--.

Signed and Sealed this

First Day of October, 1991

Attest:

HARRY F. MANBECK, JR.

*Attesting Officer*     *Commissioner of Patents and Trademarks*